(No Model.)

C. M. HILLS.
PAINT POT.

No. 323,420. Patented Aug. 4, 1885.

WITNESSES:
A. G. Morey
T. E. O'Brien

INVENTOR
Caroline M. Hills.
BY
G. L. Chapin.
ATTORNEY

UNITED STATES PATENT OFFICE.

CAROLINE M. HILLS, OF CHICAGO, ILLINOIS.

PAINT-POT.

SPECIFICATION forming part of Letters Patent No. 323,420, dated August 4, 1885.

Application filed December 31, 1884. (No model.)

*To all whom it may concern:*

Be it known that I, CAROLINE M. HILLS, a citizen of the United States and resident of Chicago, Illinois, have invented new and useful Improvements in Pots for Cleaning Paint-Brushes, reference being had to the accompanying drawings illustrating the invention.

The present invention relates to new and improved means for cleaning artists' and painters' brushes.

In all kinds of painting it is necessary that the brushes be cleaned from time to time, and sometimes very often; and this is especially the case with artists' brushes, which have to be cleaned so often that the ordinary means for that purpose are too tedious and perplexing. To obviate this difficulty, I have invented a pot for cleansing painters' brushes, and its nature is as follows: A receptacle is made of metal, and preferably in cylindrical form, and somewhat higher than its diameter, and projecting inward from a point a little distance from the top is a flange of suitable strength to support the cleaning-cup, and to turn the overflow from the wipings of the brush back into the pot. The cup is supported by brackets resting on the said flange, and between the cup and the flange is a space for the return of said overflow cleaning material. To facilitate the wiping of the brush, a burr is turned inward on the top edge of the cup, and to remove the cup ears are attached. The periphery of the cup is of solid sheet metal, but the bottom is made of perforated metal, so that when the pot is supplied properly with benzine or other cleaning liquid it comes up some little distance into the cup, according to the size of the brush to be cleaned. The cleaning is done by placing the brush in the liquid and rubbing it gently on the perforated metal, which will not only clean the brush but the paints will precipitate to the bottom of the pot, and leave the benzine in the cup comparatively clear. When not in use, the pot is to be securely closed to prevent the evaporation of the cleaning fluid and to keep dirt out. The paints precipitated to the bottom of the pot can be removed and used for such purpose as they are suited, the benzine being first drained off and the balance evaporated.

Figure 2:
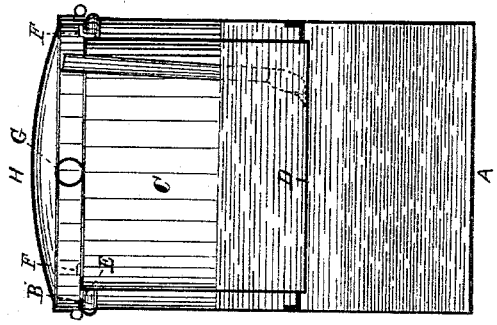
Figure 3:
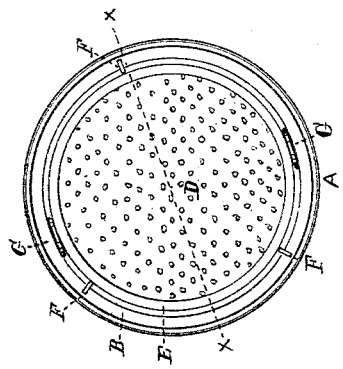
Figure 1:
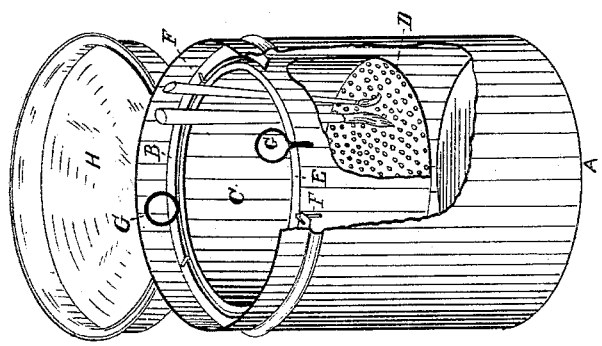

Figure 1 is a perspective representation of a mechanism embodying my invention, with the periphery of the pot and cup broken away to show the construction, and the cover shown open. Fig. 2 is a vertical sectional elevation thereof on line $x$, Fig. 3. Fig. 3 is a plan view with the cover removed.

A represents the pot, which in practice can be made of tin, and externally japanned or ornamented for artists' use, and I prefer that its height should exceed its diameter. On the inside of this pot, a little distance down from the top edge, is formed an internal flange, B, which serves to support the cup C, and a guide for directing the overflow from the wiping of the brush back into the pot. The object of placing the flange down from the top of the pot is that no paint or cleaning material shall come in contact with the exterior of the device. The cup is also made of tin, with a perforated bottom, D, and a burr, E, is turned inward on the top edge to serve as a scraper to remove the cleaning fluid from the brush. Three or more brackets, F, are secured to the periphery of the cup to suspend it from the flange B, and to the periphery is also attached eyes G, for lifting the cup from the pot. From this it will be seen that the space between the cup and the flange is about equal to the diameter of the wire brackets, but that the space between the periphery of the cup and inside of the pot is something more than the width of the flange B. This allows sufficient space for any overflow to pass down. The periphery of the cup being solid, any paint in the overflow cannot enter the cup but must fall to the bottom.

The advantage will be understood by reference to the fact that it is the most difficult to clean the paint from the brush nearest the handle or stock, and that in wiping the brush on the burr E some of that paint will ooze out from above the contact of the brush with the burr. An ordinary cover, H, is hung to the pot, whereby the contents are kept clean and from evaporating.

Having thus described my invention, what I claim, and desire to secure by Letters Patent, is—

In pots for cleaning paint-brushes, the pot A, provided with flange B and cover H, in combination with the removable cup C, having a solid periphery and perforated bottom, D, eyes G, and bracket-supports F, attached to its periphery and extending down past the flange B, and separating it from the cup, and forming a space for the overflow from wiping the brush, the cup and pot having such a relative height as will allow a chamber below the cup for the precipitated paint, as specified and shown.

CAROLINE M. HILLS.

Witnesses:
 A. G. MOREY,
 G. L. CHAPIN.